United States Patent [19]
Peng et al.

[11] Patent Number: 5,529,763
[45] Date of Patent: Jun. 25, 1996

[54] CO ADSORBENTS WITH HYSTERESIS

[75] Inventors: Xiang-Dong Peng, Allentown; Ronald Pierantozzi, Orefield; Timothy C. Golden, Allentown, all of Pa.

[73] Assignee: Air Products and Chemicals, Inc., Allentown, Pa.

[21] Appl. No.: 416,609

[22] Filed: Apr. 5, 1995

Related U.S. Application Data

[62] Division of Ser. No. 235,593, Apr. 29, 1994.

[51] Int. Cl.$^6$ .................................................. B01D 53/02
[52] U.S. Cl. ............................ 423/246; 423/247; 95/140
[58] Field of Search .................... 95/140, 902; 423/246, 423/247; 502/74, 75, 225, 345, 407, 415

[56] References Cited

U.S. PATENT DOCUMENTS

| | | | |
|---|---|---|---|
| 3,575,885 | 4/1971 | Hunter et al. | 252/429 |
| 3,789,106 | 1/1974 | Hay et al. | 423/247 |
| 4,019,879 | 4/1977 | Rabo et al. | 55/68 |
| 4,470,829 | 9/1984 | Hirai et al. | 55/68 |
| 4,587,114 | 5/1986 | Hirai et al. | 423/247 |
| 4,713,090 | 12/1987 | Yokoe et al. | 55/68 |
| 4,717,398 | 1/1988 | Pearce | 55/58 |
| 4,914,076 | 4/1990 | Tsuji et al. | 502/407 |
| 4,917,711 | 4/1990 | Xie et al. | 55/68 |
| 5,126,310 | 6/1992 | Golden et al. | 502/417 |
| 5,175,137 | 12/1992 | Golden et al. | 502/417 |
| 5,258,571 | 11/1993 | Golden et al. | 585/829 |
| 5,300,271 | 4/1994 | Golden et al. | 423/247 |

FOREIGN PATENT DOCUMENTS

| | | | |
|---|---|---|---|
| 61-242638 | 10/1986 | Japan | 502/407 |
| 62-65919 | 3/1987 | Japan | 502/407 |
| 5228339 | 9/1993 | Japan | 502/400 |

OTHER PUBLICATIONS

"Basic College Chemistry" by Joseph A. Babor; p. 256, 2nd ed.; 1953; Thomas Y. Crowell Company, New York.

*Primary Examiner*—Gary P. Straub
*Assistant Examiner*—Timothy C. Vanoy
*Attorney, Agent, or Firm*—Geoffrey L. Chase

[57] ABSTRACT

The Present Invention is directed to a composition, its synthesis and a process for adsorptive separation of carbon monoxide from gas mixtures using adsorbents, which comprise cuprous compounds on amorphous oxide macroporous supports. The compositions are prepared by impregnating cupric compounds on supports followed by reduction of the cupric compound to the corresponding cuprous compound. The reduction can be performed by the use of a reducing gas, preferably synthesis gas at relatively low temperatures up to 150° C., preferably preceded by the use of elevated temperature above 250° C. All the adsorbents described in this invention consist of CuCl particles of finite size supported on macroporous support materials including alumina and silica gel. Among the ingredients used to form supported CuCl fine particles are support materials of low dispersing power, high copper loading, absence of dispersants, and proper post heat-treatment. The bulk nature of the active component (i.e., CuCl particles) and the resulting hysteresis in desorption provide adsorbents which have both high working capacity and high selectivity for a pressure swing adsorptive separation process.

5 Claims, 3 Drawing Sheets

CO ADSORBENTS WITH HYSTERESIS

This is a division of application Ser. No. 08/235,593 filed Apr. 29, 1994.

FIELD OF THE INVENTION

The Present Invention is directed to adsorptive separation of carbon monoxide from gas mixtures using adsorbents of active composite copper-containing compositions produced by impregnation of a support with cupric compounds.

BRIEF DESCRIPTION OF THE PRIOR ART

Both carbon monoxide and hydrogen are gases widely used in the chemical industry. The current technique used to produce both pure hydrogen and carbon monoxide is to steam reform methane, remove carbon dioxide by scrubbing with amine solutions and finally cryogenic separation of carbon monoxide and hydrogen. However, there is considerable interest in developing an adsorption process that is capable of separating carbon monoxide and hydrogen. The key advantages of an adsorption system over cryogenic separations are low energy requirements, capability of producing higher purity hydrogen and absence of any needs for liquid cryogens. The principle technical hurdle in developing an adsorption system to produce high purity carbon monoxide is achieving an adsorbent that is capable of separating dilute, unreacted methane in the steam methane reformation off-gas from bulk carbon monoxide. The carbon monoxide over methane selectivity of an adsorbent must be high to produce a high purity carbon monoxide stream. Chemical users of carbon monoxide are requiring higher and higher product purity to eliminate unwanted side reaction during carbon monoxide use and the synthesis of engineering plastics and polyurethane foams. Current methane purity specification in carbon monoxide for many applications is nearing 25 PPM or less. Thus, an adsorbent capable of producing carbon monoxide of this purity must demonstrate high carbon monoxide selectivity. In addition to high carbon monoxide selectivity, an adsorbent for this process must also exhibit a large carbon monoxide working capacity. The larger the carbon monoxide working capacity, the smaller the adsorption beds and lower capital costs for such an adsorptive separation.

U.S. Pat. No. 3,789,106 discloses the use of zeolites and mordenites that have their sodium ions ion-exchanged with copper as well as other metals to adsorb carbon monoxide. The main objective is to remove trace amounts of carbon monoxide from gas mixtures. In the case of this patent, the copper ion becomes a cation replacing sodium in the zeolitic or mordenitic molecular sieve structure.

U.S. Pat. No. 4,019,879 discloses the adsorptive separation of carbon monoxide using zeolitic molecular sieves which are ion exchanged to introduce cations of cuprous valences into the structure. Cupric ions may first be impregnated in the zeolitic structure followed by reduction of the cupric ions to cuprous ions in the ion exchange procedure.

U.S. Pat. No. 4,470,829 discloses an adsorbent for selective adsorption of carbon monoxide comprising a copper halide, an aluminum halide and a polystyrene or its derivative as one embodiment or a copper halide and aluminum halide and activated carbon or graphite as a second embodiment. The adsorbent is produced by mixing together the three components in a hydrocarbon solvent and then driving off the solvent.

U.S. Pat. No. 4,587,114 discloses the production of a carbon monoxide adsorbent using cuprous or cupric compounds impregnated on a carbon support using solvents which are removed after the impregnation. The solvents include water, aqueous hydrochloric acid or ammonium formate, primary or secondary alcohol having 1 to 7 carbon atoms, acetone, ethylacetate, formic acid, acetic acid, benzene, toluene, propionitrile, acetonitrile and aqueous ammonia.

U.S. Pat. No. 4,713,090 discloses a carbon monoxide adsorbent comprising a composite support of silica and/or alumina and activated carbonized material carrying a copper compound impregnated with the assistance of a solvent including aqueous solutions of ammoniacal formic acid, ammonia water and nitrogen-containing solvents selected from the group of propionitrile, acetonitrile, diethyl amine, dimethyl formamide and N-methyl pyrrolidone.

U.S. Pat. No. 4,914,076 discloses an adsorbent for selective adsorption of carbon monoxide comprising a support of alumina or silica-alumina impregnated with a cupric salt carried by a solvent incorporating a reducing agent, after which the solvent is removed and the cupric salt is reduced to a cuprous salt. The solvent utilized to deposit the cupric compound was water containing a reducing agent. Other solvents identified include formalin, formic acid, alcohol and the like. The reducing agent includes low valence metal salts of iron, tin, titanium and chromium and organic compounds in low degree of oxidation including aldehydes, saccharides, formic acid, oxallic acid and so on.

U.S. Pat. No. 4,917,711 discloses a carbon monoxide selective adsorbent produced from mixing in solid form or through solvent intermixing a support from the group of zeolites, alumina, silica gel, alumino silicate, alumino phosphate and combinations with a cuprous compound, wherein the cuprous compound can be derived from a cupric compound deposited on the support from a solvent selected from the group of water, hydrochloric acid-containing aqueous solution, primary or secondary alcohols having 1 to 7 carbon atoms, acetone, ethylacetate, hydrocarbons having 4 to 7 carbon atoms, propionitrile and acetonitrile.

U.S. Pat. Nos. 5,175,137; 5,126,310 and 5,258,571 disclose copper based carbon monoxide adsorbents produced by highly dispersing copper as a monolayer with a dispersant, such as ammonium citrate.

These prior art patents attempt to produce a carbon monoxide selective adsorbent with high dispersions of cuprous ions on a support to effectively adsorb bulk quantities of carbon monoxide from gas mixtures. However, these adsorbents follow traditional Langmuir type isotherms in adsorption of carbon monoxide and desorption of carbon monoxide, unlike the Present Invention. The Present Invention overcomes these limitations by providing a novel adsorbent, having unexpectedly high hysteresis in adsorption desorption using cuprous ion on a macroporous support as will be described in greater detail below.

BRIEF SUMMARY OF THE INVENTION

The Present Invention is an adsorbent for selectively adsorbing carbon monoxide from a gas mixture containing carbon monoxide, comprising; cuprous chloride particles of a size in the range of approximately 1 to 100 millimicrons supported on a macroporous support of an amorphous oxide.

Preferably, the cuprous chloride particles are crystalline.

Preferably, the particles are of a size in the range of approximately 16 to 51 millimicrons.

Preferably, the amorphous oxide is selected from the group consisting of alumina, silica, silica-alumina and mixtures thereof. Preferably, the macroporous support has an average pore size in the range of approximately 50 to 150 Angstroms.

Preferably, the macroporous support has a surface area in the range of approximately 100 to 600 $m^2/g$.

Preferably, the adsorbent is prepared by contacting the support with a solution of cupric chloride to impregnate the cupric chloride on the support, removing the solvent, heating the impregnated support to at least 200° C. and reducing the cupric chloride to cuprous chloride.

More preferably, the Present Invention is an adsorbent for selectively adsorbing carbon monoxide from a gas mixture containing carbon monoxide and at least one other gas selected from the group consisting of carbon dioxide, methane and nitrogen, comprising; cuprous chloride crystalline particles of a size in the range of approximately 1 to 100 millimicrons supported on a macroporous support of an amorphous oxide having an average pore size in the range of approximately 50 to 150 Angstroms wherein the adsorbent is prepared by contacting the support with a solution of cupric chloride to impregnate the cupric chloride on the support, removing the solvent, heating the impregnated support to at least 200° C. and reducing the cupric chloride to cuprous chloride.

The Present Invention is also a method for synthesis of an adsorbent of cuprous chloride particles of a size in the range of approximately 1 to 100 millimicrons supported on a macroporous support of an amorphous oxide for selectively adsorbing carbon monoxide from a gas mixture containing carbon monoxide, comprising; contacting the support with a solution of cupric chloride to impregnate the cupric chloride on the support, removing the solvent, heating the impregnated support to at least 200° C. and reducing the cupric chloride to cuprous chloride.

Preferably, the solvent is removed by drying at a temperature of at least approximately 100° C.

Preferably, heating is performed at a temperature of 250° C.

More preferably, heating is performed in an atmosphere selected from the group consisting of nitrogen and air.

Still more preferably, heating is performed at a temperature of 420° C.

Preferably, the cupric chloride is reduced with a reducing agent selected from the group consisting of hydrogen, carbon monoxide and synthesis gas.

Preferably, the cupric chloride is impregnated on said support at a loading of at least 15 weight percent based upon the weight of copper to the weight of the support.

The Present Invention is also a process of selectively separating carbon monoxide from a gas mixture containing carbon monoxide and at least one other gas selected from the group consisting of carbon dioxide, methane and nitrogen, comprising; (a) contacting the gas mixture with an adsorbent comprising cuprous chloride particles of a size in the range of approximately 1 to 100 millimicrons supported on a macroporous support of an amorphous oxide, (2) selectively adsorbing carbon monoxide on the adsorbent, and (3) separately desorbing the carbon monoxide from the adsorbent to recover the carbon monoxide.

Preferably, the cuprous chloride particles are crystalline.

More preferably, the cuprous chloride crystalline particles undergo a phase change with the carbon monoxide to form a cuprous chloride-carbon monoxide crystal during adsorption.

More preferably, the cuprous chloride-carbon monoxide crystals undergo a phase change during desorption of the carbon monoxide at lower pressure to form a cuprous chloride crystalline particle.

Preferably, the gas mixture is passed through one or more beds of said adsorbent in a sequence of steps, comprising; (a) adsorbing the carbon monoxide from the gas mixture in a bed of the adsorbent, (b) desorbing the bed of adsorbent after adsorption, (c) purging the bed of adsorbent with carbon monoxide, (d) evacuating the bed of adsorbent to recover the carbon monoxide, and (e) repressurizing the bed of adsorbent to the pressure of adsorption by passing a gas into the bed of adsorbent.

DETAILED DESCRIPTION OF THE INVENTION

Figure 1A:
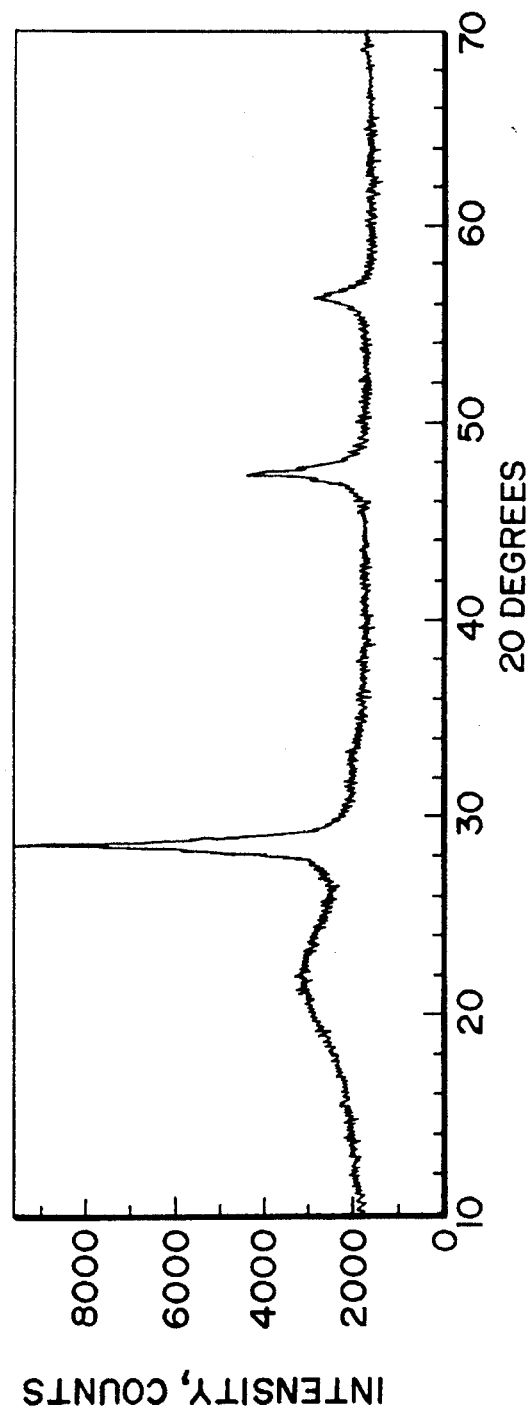
FIG. 1 comprises x-ray diffraction patterns for a $Cu/SiO_2$ adsorbent before (a) and after (b) carbon monoxide adsorption.

The Present Invention is directed to adsorbent compositions, their synthesis and processes for using the adsorbent compositions to selectively adsorbed carbon monoxide from gas mixtures typically having carbon dioxide, hydrogen, methane, nitrogen, as well as other potential gases or impurities. The carbon monoxide adsorbents of the Present Invention are comprised of cuprous chloride particles supported on macro- or mesoporous support materials, typically selected from alumina, silica, silica-alumina and silica gels. The unique feature of the adsorbent compositions is the existence of cuprous chloride particles of a finite size serving as the active entity for carbon monoxide adsorption, wherein the cuprous chloride particle size is in the range of approximately 1 to 100 millimicrons, more preferably 16 to 51 millimicrons. These cuprous chloride particles are preferably in a highly crystalline state. When such a cuprous chloride crystalline particulate adsorbent is exposed to an adequate carbon monoxide pressure, a solid cuprous chloride carbon monoxide complex is formed on the surface of the support for the cuprous chloride. The mechanism of carbon monoxide uptake by the adsorbent through the formation of bulk cuprous chloride carbon monoxide complexes on the surface of the adsorbent is supported by x-ray diffraction patterns shown in FIG. 1A and B. FIG. 1A shows that in the absence of carbon monoxide, the cuprous chloride crystalline particles supported on an appropriate amorphous oxide of the Present Invention is the dominant phase of the adsorbent, which is prepared in accordance with Example 4 below. The x-ray diffraction pattern is indicative of the crystalline nature of the cuprous chloride and the width of the peaks of the diffraction pattern are indicative of particle size.

Figure 1B:
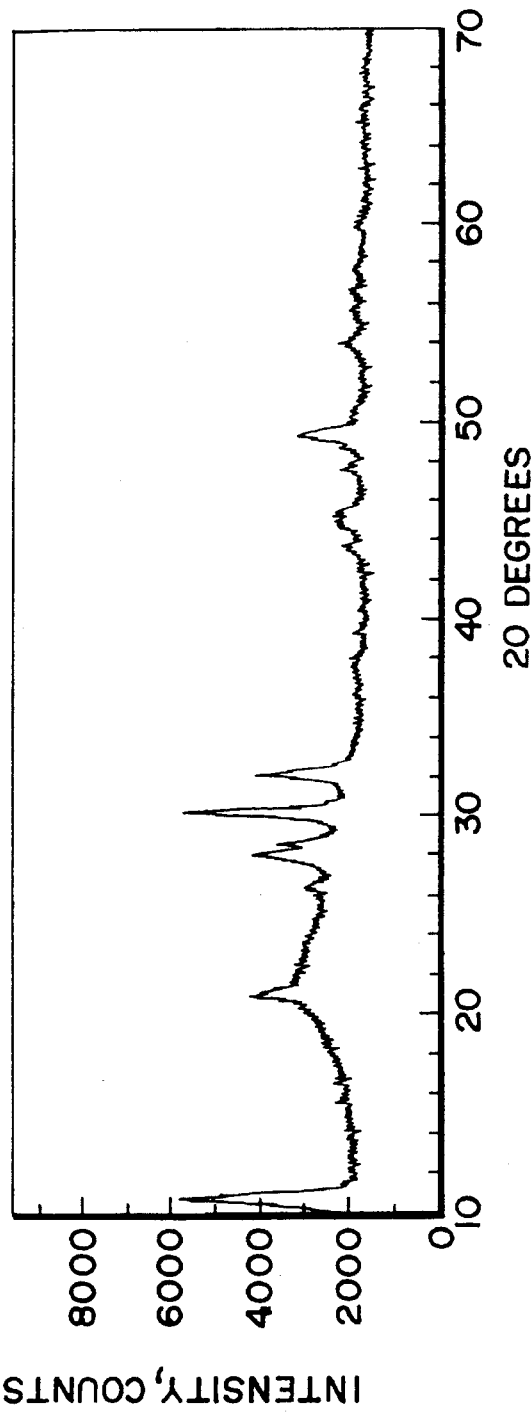

Upon carbon monoxide adsorption to saturation, the x-ray diffraction peaks from the cuprous chloride phase become much smaller and are accompanied by the appearance of a powder pattern corresponding to cuprous chloride carbon monoxide bulk complexes. The cuprous chloride carbon monoxide bulk complex is identified in FIG. 1B, which shows the characteristic peaks for that phase change composition.

The copper loadings that are preferably achieved by the techniques of the Present Invention are greater than approximately 15 weight % copper based on the total composite composition. Although on supports which do not have an inherent dispersing property, lower loadings are acceptable.

The amorphous oxide supports are compounds well known in the prior art and do not require further description. Each such support is selected from those forms of amorphous oxide which have macroporous structure, particularly in contrast to the molecular size of molecules, such as methane. More specifically, the amorphous oxide support should not effect molecular sieving and capture of molecules, such as methane. The amorphous oxides include alumina, silica-alumina, silica, titania and mixtures thereof. The term amorphous indicates a generally noncrystalline molecular structure. Crystalline materials, such as zeolites are not included. The macroporosity constitutes a support structure that has a predominant amount of its pores larger than approximately 20 Angstroms in diameter up to 500 Angstroms, preferably 50 to 150 Angstroms. The macroporosity is such as to avoid sieving and surface affinity enhancements for molecules, such as methane.

The cuprous chloride active specie of the composite supported adsorbent of the Present Invention is most easily impregnated on the support in the form of cupric chloride which is readily soluble in water as a carrier. Therefore, under most circumstances a cupric chloride reagent is mixed with water and impregnated on the amorphous oxide support with subsequent conversion of the cupric chloride impregnate to cuprous chloride, the active carbon monoxide adsorbing specie.

Preferably, the synthesis process for producing the composite compositions of the Present Invention includes dissolution of the cupric compound in an aqueous solution. The addition of cupric compound on the support until the appropriate desired weight loading of the cupric compound is achieved is important. For alumina supports a loading of at least 15 wt % is desirable. Reduction of the composite composition, particularly the cupric ion to cuprous ion, by contact with a reducing gas at temperatures greater than 100° C., such as carbon monoxide hydrogen or synthesis gas (a combination of $H_2$, CO, as well as potentially $CO_2$, methane and nitrogen) is also important. Alternatively, heating, preferably in an inert gas, in the range of approximately 150° to 450° C., preferably at least 200° C., more preferably at least 250° C., followed by contact with the reducing gas assists in providing the highest activity of the composition.

Figure 2:
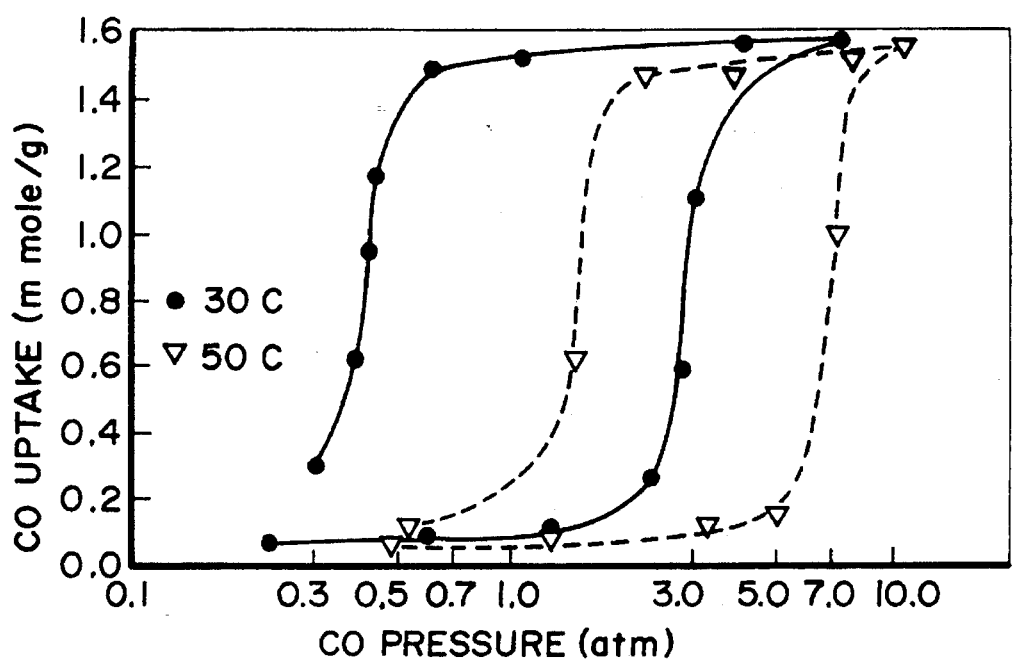
FIG. 2 is a carbon monoxide isotherm for a $Cu/SiO_2$ adsorbent at 30° C. and 50° C. showing hysteresis.

FIG. 2 displays the carbon monoxide uptake or isotherm of a cuprous chloride-silicon dioxide adsorbent of the Present Invention as the function of equilibrium carbon monoxide pressure at 30° and 50° C. Two sets of data were obtained for each temperature. The lower or adsorption branch was obtained by starting with a clean adsorbent and using increasing equilibrium carbon monoxide pressure, while the upper or desorption branch was obtained by starting with a carbon monoxide saturated sample at high equilibrium pressure and working down to low equilibrium pressure. The isotherms shown in FIG. 2 differ from the Langmuir-type isotherms obtained from carbon monoxide adsorbents based upon an atomically dispersed cuprous chloride. There is a large hysteresis between adsorption and desorption; that is, there are separate adsorption and desorption branches of the isotherm. Secondly, the shape of the isotherms does not change significantly with temperature. Instead the isotherm shifts toward higher pressure with increasing temperature. Thirdly, both adsorption and desorption branches exhibit phase-transition-like behavior, that is, sudden change in carbon monoxide uptake in a small pressure differential region. These regions are referred to as phase transition regions. All of these three features can be uniquely attributed to the formation of cuprous chloride-carbon-monoxide crystallites on the adsorbent surface, wherein carbon monoxide is adsorbed in a bulk particle of 1 to 100 millimicrons within the crystal lattice of the cuprous chloride adsorbent specie, in contrast to the adsorption of carbon monoxide by atomic size layers of cuprous chloride in prior adsorbents.

The shape of the adsorption branches of the isotherms in FIG. 2 indicate that there is little atomically dispersed cuprous chloride on the adsorbent surface of the Present Invention, because little carbon monoxide uptake is observed in the low pressure region, such as below 2.7 atmospheres at 30° C. If there were atomically dispersed cuprous chloride on the surface of the adsorbents of the Present Invention and if the uptake of carbon monoxide were due to chemical adsorption of carbon monoxide, one would observe Langmuir-type isotherms in this pressure region. Therefore, the present inventors believe that the carbon monoxide uptake by the adsorbents of the Present Invention are due to a mechanism other than mere chemical adsorption, that is; formation of a bulk copper-CO complex.

The shape of the desorption branch of the isotherms shown in FIG. 2 is determined by the thermodynamics of the decomposition of the cuprous chloride-carbon monoxide bulk complex. The kinetic barrier associated with the phase transition from cuprous chloride particles into cuprous chloride-carbon monoxide particles results in a threshold pressure for carbon monoxide adsorption to occur, thereby, leading to the hysteresis illustrated in FIG. 2. The temperature dependence of the adsorbent is also unique, shifting toward the high pressure side with increasing temperature due to the nature of the cuprous chloride-carbon monoxide formation and decomposition.

Copper in the reduced state, either copper in the valence of one or copper metal is active for carbon monoxide binding, the copper in a bivalent state is not. However, copper in the bivalent salt state is very soluble in aqueous solution, while copper in the monovalent salt state is sparingly soluble in either strong acid or base. Hence, compositions where adsorbents are produced from bivalent copper, followed by in situ reduction to monovalent copper or metal are easier and less expensive to produce.

The following examples describe techniques to make carbon monoxide adsorbents of the Present Invention.

EXAMPLE 1

44.4 grams of Davison grade 59 silica gel, pre-dried in air at 600° C. for 4 hours, was impregnated with a solution of 17.0 grams of Aldrich $CuCl_2 \cdot 2H_2O$ and 48.8 mil deionized water, dried in air at 120° C. for 12 hours followed by heat-treatment in nitrogen (APCI, zero grade) at 420° C. for 6 hours. The sample was activated with a syngas mixture at 150° C. for 12 hours prior to isotherm measurements. The CO isotherms from this sample at 30° and 50° C. are displayed in FIG. 2. It can be seen that the isotherms consist of an adsorption and desorption branch, i.e., a strong hysteresis in desorption. At 30° C., this adsorbent has a CO saturation capacity of 1.6 mmole/g at 7 atm, and a working capacity of 1.2 mmole/g between 0.1 and 1.0 atm.

EXAMPLE 2

5.05 pounds of LaRoche A201 alumina, pre-dried in air at 400° C. for 14 hours, was impregnated with a solution consisting of 970 grams of Aldrich $CuCl_2.2H_2O$ and 915 ml of deionized water, dried in air at room temperature for 5 hours and at 129° C. for 15 hours. The above sample was again impregnated with a solution consisting of 850 g Aldrich $CuCl_2.2H_2O$ and 802 ml of deionized water, followed by drying in air at room temperature for 4 hours and drying in nitrogen at 250° C. for 15 hours. The sample was activated in a syngas mixture at 150° C. for 15 hours. The isotherm of the sample at 30° C., shown in FIG. 3, exhibits hysteresis. The CO capacity at 8.5 atm is 1.8 mmole/g and the CO working capacity between 0.1 and 1.0 atm is 1.1 mmole/g.

EXAMPLE 3

Figure 4:
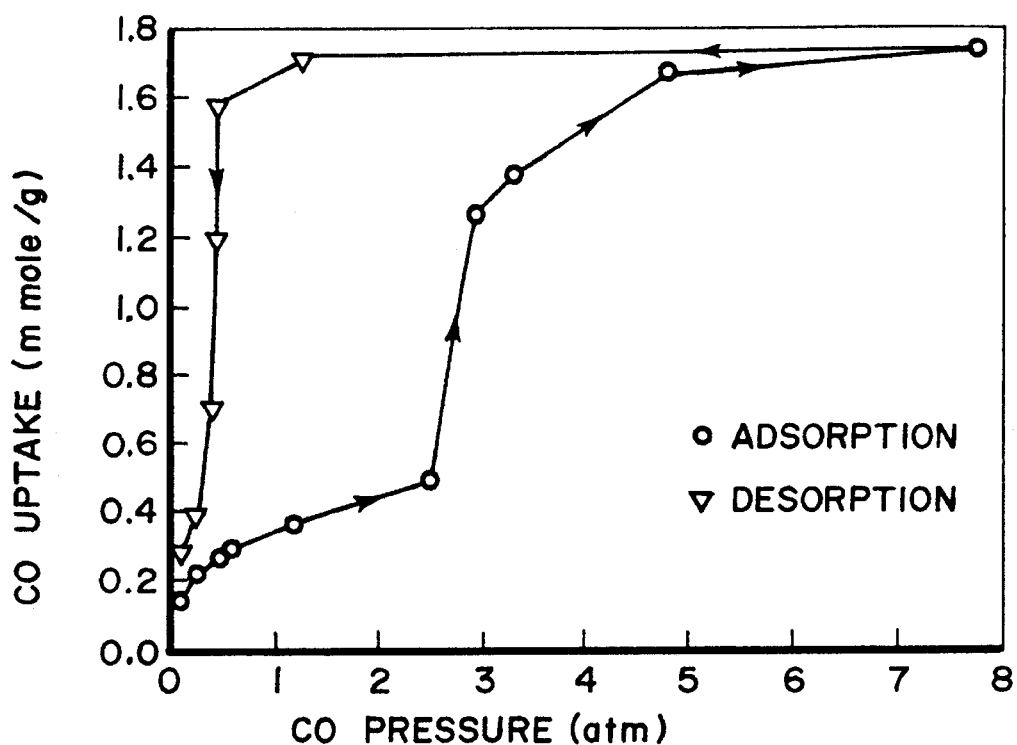
FIG. 4 is a carbon monoxide isotherm for a $Cu/Al_2O_3$ adsorbent at 30° C. showing hysteresis.
Figure 5:
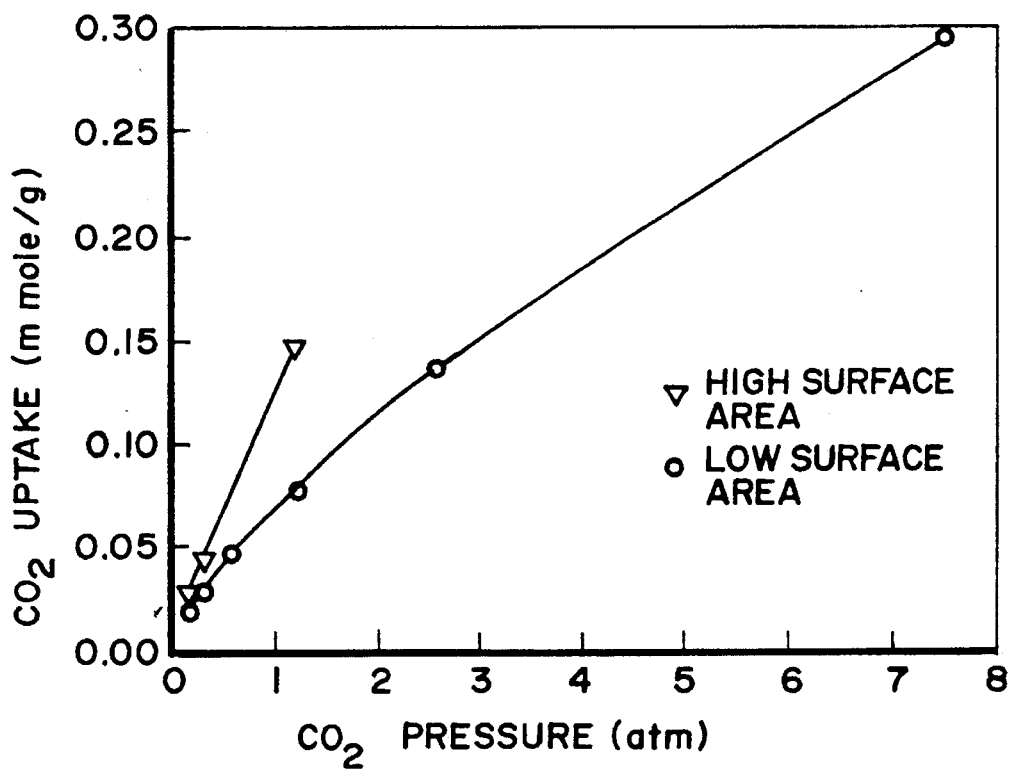
FIG. 5 is a carbon dioxide isotherm for a high surface area adsorbent, LaRoche A201 $Al_2O_3$, poresize 100A, surface area 325 $m^2/g$, (microporous) and a low surface area adsorbent, Alcoa CSS-105 $Al_2O_3$, surface area 113 $m^2/g$, (macroporous) showing that the impurity carbon dioxide is co-adsorbed to a greater extent on high surface area adsorbents.

40 grams of Alcoa CSS-105 alumina was impregnated with a solution consisting of 21.1 grams of Aldrich $CuCl_2.2H_2O$ and 28 ml deionized water, dried in air at room temperature overnight, then dried in nitrogen at 250° C. for 7 hours, and finally activated in a syngas mixture at 150° C. for 11 hours. The isotherm of the sample at 30° C. is shown in FIG. 4. The sample shows hysteresis and has a CO capacity of 1.7 mmole/g at 8 atm and a CO working capacity of 1.4 between 0.1 and 1 atm. The low surface area of the support material of the sample (113 m²/g) leads to lower $CO_2$ uptake as compared with the sample prepared from high surface area support (325 m²/g), as shown in FIG. 5, indicative of higher selectivity in the low surface area support based adsorbent.

EXAMPLE 4

24 grams of Davison grade 59 silica gel, pre-dried in air at 600° C. for 6 hours, was impregnated with a solution consisting of 13.5 grams of Aldrich $CuCl_2.2H_2O$ and 27 ml of deionized water, dried in air at room temperature for 8 hours and at 120° C. for 12 hours. The sample was then treated in nitrogen at 420° C. for 6 hours and activated in a syngas mixture at 150° C. for 15 hours. The resulting adsorbent exhibits hysteresis and has a saturation CO capacity of 2.1 mmole/g at 6 atm and a CO working capacity of 1.9 mmole/g between 0.1 and 1 atm.

EXAMPLE 5

20 grams of Davison grade 636 silica gel, pre-dried at 600° C. for 6 hours, was impregnated with a solution containing 12.8 grams of Aldrich $CuCl_2.2H_2O$ and 16 ml of deionized water, dried in air at room temperature for 7 hours and at 120° C. for 12 hours. The sample was then treated in nitrogen at 420° C. for 5 hours and activated in a syngas mixture at 150° C. for 14 hours. The resulting adsorbent exhibits hysteresis and has a CO saturation capacity at 7 atm of 1.4 mmole/g.

EXAMPLE 6

160.6 grams of Alcoa CSS-105 alumina was impregnated with a solution containing 78.8 grams of Aldrich $CuCl_2.2H_2O$ and 75 ml of deionized water, dried in air at room temperature for 15 hours and at 250° C. for 6 hours. Upon activation in a syngas mixture at 150° C. for 15 hours, the sample exhibits hysteresis and has a CO capacity of 1.25 mmole/g at 6.6 atm.

The range of copper loading for generating CuCl particles, therefore hysteresis, depends on the dispersing power of support materials. For the support with poor dispersing ability toward CuCl such as silica gel, any loading will result in the formation of CuCl particles and isotherms with hysteresis. For alumina that has high dispersing ability, copper loadings above 15 wt % are preferred to generate appropriately sized CuCl particles on the surface.

EXAMPLE 7

80 grams of LaRoache A201 alumina was impregnated with a solution consisting of 25.3 grams of Aldrich $CuCl_2.2H_2O$ and 36 ml of deionized water, dried in air at room temperature for 23 hours and at 120° C. for 12 hours. The sample was then treated in nitrogen at 420° C. for 6 hours and activated in syngas mixture at 150° C. for 15 hours. The resulting adsorbent has a CO capacity at 7.7 atm of 0.81 mmole/g, but little hysteresis. The copper loading of this sample is only 11.6 wt %.

Heat treatment following impregnation and air drying at 120° C. is also desireable to produce isotherms with substantial hysteresis. The post heat treatment can be conducted both in nitrogen or in air at temperatures above 250° C.

EXAMPLE 8

25 grams of Davison grade 59 silica gel, pre-dried in air at 580° C. for 15 hours, was impregnated with a solution containing 2.4 grams of Aldrich $CuCl_2.2H_2O$ and 27 ml of deionized water, dried in air at room temperature for 5 hours and 120° C. for 12 hours. Upon activation in a syngas mixture, the sample exhibited a CO capacity of 0.26 mmole/g at 7.5 atm without hysteresis. After the sample was treated in nitrogen at 420° C. for 6 hours, it showed hysteresis and a CO capacity of 0.34 mmole/g at 7.5 atm.

The utility of the adsorbents produced by the Present Invention is in a pressure swing adsorptive separation process to recover carbon monoxide. The steps include (1) pressurization with pure hydrogen countercurrent to the direction of feed to superambient pressure (200 psig), (2) feed with a gas mixture containing carbon monoxide, methane, hydrogen and nitrogen at 200 psig, (3) cocurrent depressurization of the column to 25 psig. (This depressurization effluent is recycled to the feed end of the bed to insure high carbon monoxide recovery), (4) cocurrent purge with product carbon monoxide at 0 to 5 psig and (5) evacuation of pure carbon monoxide product at vacuum levels of 80 torr. Then the cyclic process is continued from steps 1 through 5.

Figure 3:
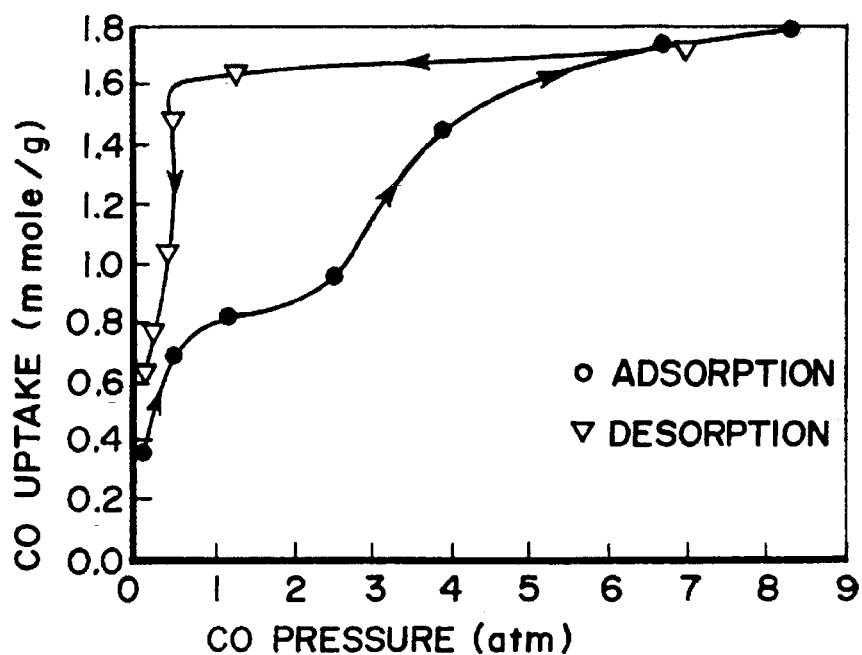
FIG. 3 is a carbon monoxide isotherm for a $Cu/Al_2O_3$ adsorbent at 30° C. showing hysteresis.

The Present Invention differs from the traditional CuCl-based CO adsorbents in the patent literature in the physical form of the active component (i.e., CuCl), the mechanism of the interaction between CO and the adsorbents, and the preparation used to achieve the desired form of the active component. The adsorbents of the Present Invention rely on CuCl particles of size ranging from 1 to 100 millimicrons, as opposed to the highly dispersed CuCl of the known adsorbents. Adsorption of CO on the adsorbents of the Present Invention is carried out by the reaction of CO with fine CuCl particles on the support surfaces, forming bulk CuCl(CO) complex. This process involves both Cu—CO bond formation and Cu—Cl bond cleavage, i.e., phase transition from CuCl to CuCl(CO) crystals. This phase transition is evidenced by the x-ray diffraction powder patterns shown in FIG. 1. The consequence of this interaction is the hysteresis in the CO isotherms as shown in FIGS. 2 to 4. The preparation for the current adsorbents is aimed at forming CuCl particles on the support surface. This is achieved by: 1) using supports with poor dispersing ability (e.g., silica gel), 2) using high copper loading when the support has strong dispersing power (e.g., alumina), 3) not using dispersing reagents, and 4) proper post heat-treatment (see Example 8).

The reason that macroporous support materials are used in the past preparations is to improve the CO selectivity over gases such as $CH_4$ and $CO_2$. The drawback of using macroporous supports in the known adsorbents is the resulting low capacity of the adsorbents. However, both high working capacity and high selectivity can be attained from the adsorbents of the Present Invention. The high working capacity is achieved through: 1) the bulk nature of the active component (i.e., surface CuCl particles, and 2) the hysteresis in desorption. The bulk nature enables more CuCl to be loaded on the surface of a support material, leading to high overall CO capacity. The hysteresis holds CO on the adsorbent surface in the depressurization step of pressure swing or vacuum swing adsorption operation, resulting in high working capacity. The high selectivity of the adsorbent is obtained by using a low surface area support without a significant loss in working capacity (Example 3). The adsorbents of the Present Invention also exhibit two additional features useful for an adsorptive CO separation process. First, the hysteresis enables the depressurization to proceed to a very low pressure (e.g., 0.4 atm at 30° C.) without significant loss of CO from the adsorbent surface. This enables a process to employ vacuum purge, therefore, consuming less CO and achieving high CO productivity. The other feature is due to the temperature dependence of the isotherm of the adsorbent of the Present Invention. For example, at 50° C., the desorption isotherm of the adsorbent of the Present Invention will be above 1 atm, making possible a pressure swing adsorption operation.

Recently the purity specification for carbon monoxide have become more stringent, requiring very low methane impurities of the order of 25 ppm in the carbon monoxide product. Adsorbents produced by the techniques described in the Present Invention are capable of separating methane from carbon monoxide to produce high purity carbon monoxide products having less than 25 ppm of methane. In this way, the composite compositions of the Present Invention overcome the drawbacks and effect a solution to outstanding problems in the industry utilizing high purity carbon monoxide.

The Present Invention has been set forth with regard to several preferred embodiments, but the full scope of the invention should be ascertained from the claims which follow.

We claim:

1. A process of selectively separating carbon monoxide from a gas mixture containing carbon monoxide and at least one other gas selected from the group consisting of carbon dioxide, methane and nitrogen, comprising; (a) contacting said gas mixture with an adsorbent comprising cuprous chloride particles of a size in the range of approximately 16 to 51 millimicrons supported on a macroporous support of an amorphous oxide selected from the group consisting of silica, alumina, silica-alumina and mixtures thereof, said adsorbent exhibiting a substantial hysteresis between the adsorption and desorption isotherms, (2) selectively adsorbing carbon monoxide on said adsorbent at a pressure above 0.3 atmospheres, and (3) separately desorbing said carbon monoxide from said adsorbent to recover said carbon monoxide.

2. The process of claim 1 wherein said cuprous chloride particles are crystalline.

3. The process of claim 2 wherein said cuprous chloride crystalline particles undergo a phase change with said carbon monoxide to form a cuprous chloride-carbon monoxide crystal during adsorption.

4. The process of claim 3 wherein said cuprous chloride-carbon monoxide crystals undergo a phase change during desorption of said carbon monoxide.

5. The process of claim 1 wherein said gas mixture is passed through one or more beds of said adsorbent in a sequence of steps, comprising; (a) adsorbing said carbon monoxide from said gas mixture in a bed of said adsorbent, (b) desorbing said bed of adsorbent after adsorption, (c) purging said bed of adsorbent with carbon monoxide, (d) evacuating said bed of adsorbent to recover said carbon monoxide, and (e) repressurizing said bed of adsorbent to the pressure of adsorption by passing a gas into said bed of adsorbent.

* * * * *